(12) United States Patent
Haataja

(10) Patent No.: US 6,761,844 B1
(45) Date of Patent: Jul. 13, 2004

(54) SPRING-LOADED EJECTORS FOR WOOD STRAND MOLDING

(76) Inventor: Bruce A. Haataja, Rte. 1, Box 18, Lake Linden, MI (US) 49945

( * ) Notice: Subject to any disclaimer, the term of this patent is extended or adjusted under 35 U.S.C. 154(b) by 270 days.

(21) Appl. No.: 10/048,332
(22) PCT Filed: May 30, 2000
(86) PCT No.: PCT/US00/14710
§ 371 (c)(1),
(2), (4) Date: Jan. 25, 2002
(87) PCT Pub. No.: WO01/91986
PCT Pub. Date: Dec. 6, 2001

(51) Int. Cl.[7] .............................................. B29C 43/50
(52) U.S. Cl. ....................... 264/123; 264/334; 425/422; 425/444
(58) Field of Search ................................ 264/109, 123, 264/334; 425/422, 444

(56) References Cited

U.S. PATENT DOCUMENTS

| 3,164,511 A | 1/1965 | Elmendorf |
|---|---|---|
| 3,238,281 A | 3/1966 | Kato |
| 4,131,705 A | 12/1978 | Kubinsky |
| 4,213,928 A | 7/1980 | Casselbrant |
| 4,241,133 A | 12/1980 | Lund et al. |
| 4,246,310 A | 1/1981 | Hunt et al. |
| 4,248,163 A | 2/1981 | Caughey et al. |
| 4,248,820 A | 2/1981 | Haataja |
| 4,337,710 A | 7/1982 | Haataja et al. |
| 4,384,019 A | 5/1983 | Haataja |
| 4,408,544 A | 10/1983 | Haataja |
| 4,440,708 A | 4/1984 | Haataja et al. |
| 4,469,216 A | 9/1984 | Haataja et al. |
| 4,790,966 A | 12/1988 | Sandberg et al. |
| 4,960,553 A | 10/1990 | DeBruine et al. |

Primary Examiner—Tim Heitbrink
(74) Attorney, Agent, or Firm—Price, Heneveld, Cooper, DeWitt & Litton, LLP

(57) ABSTRACT

Mold apparatus and method of production and ejection of molded wood strand three-dimensionally curved articles of manufacture, molded from a loosely felted flake mat, using an ejector pin assembly within said mold apparatus having ejector pins with pin head diameters of at least about 0.750 inches or greater, that exert a loaded ejector pin pressure of from approximately about 100 psi to about 1000 psi, to eject the molded wood strand article from the mold apparatus without causing excessive indentation and densification within the mat during mold processing.

14 Claims, 3 Drawing Sheets

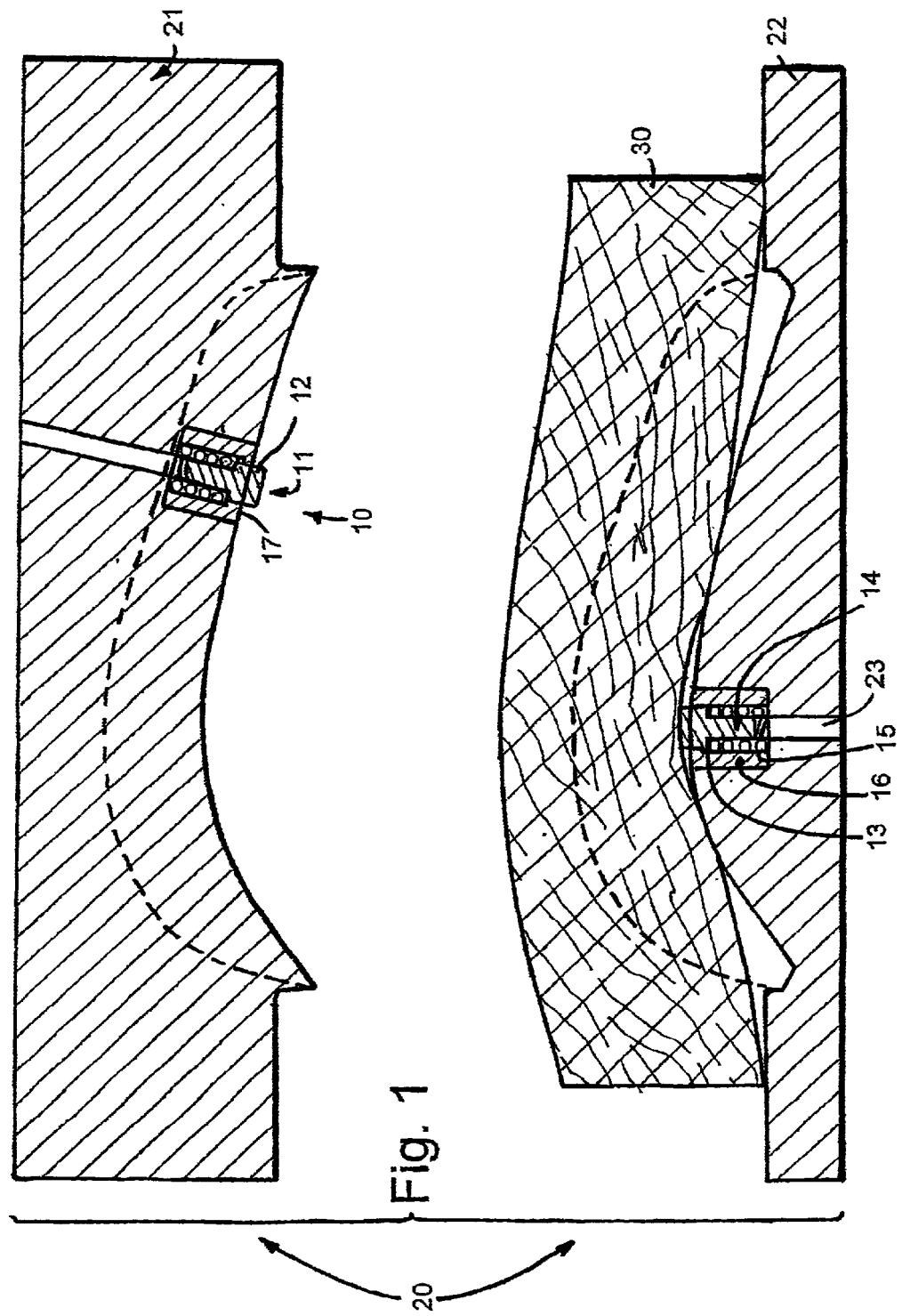

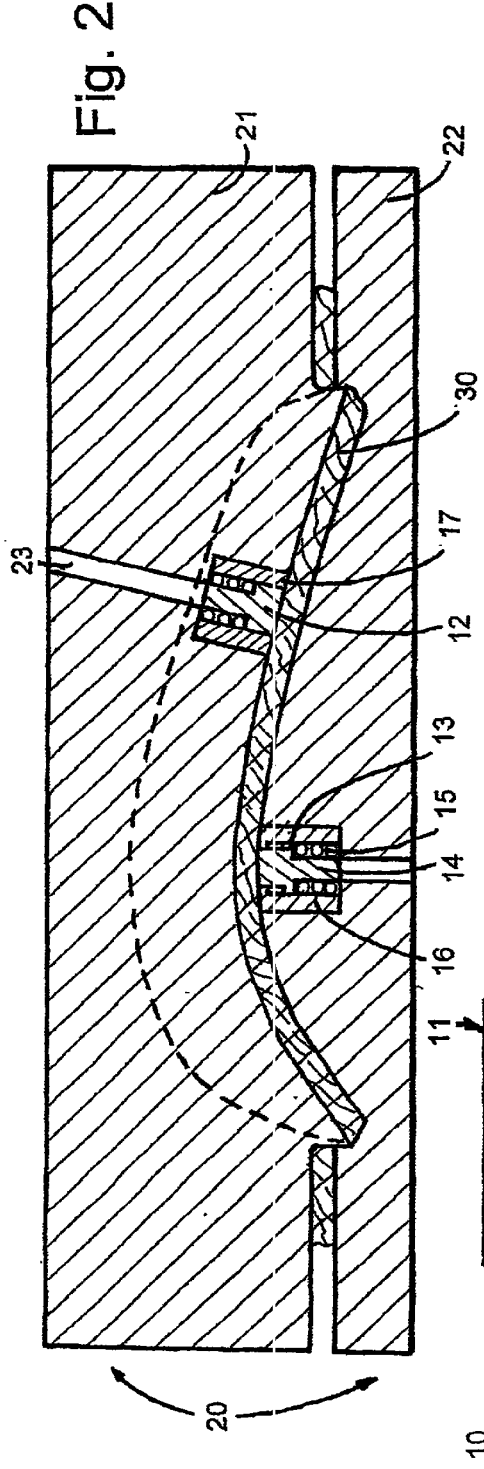
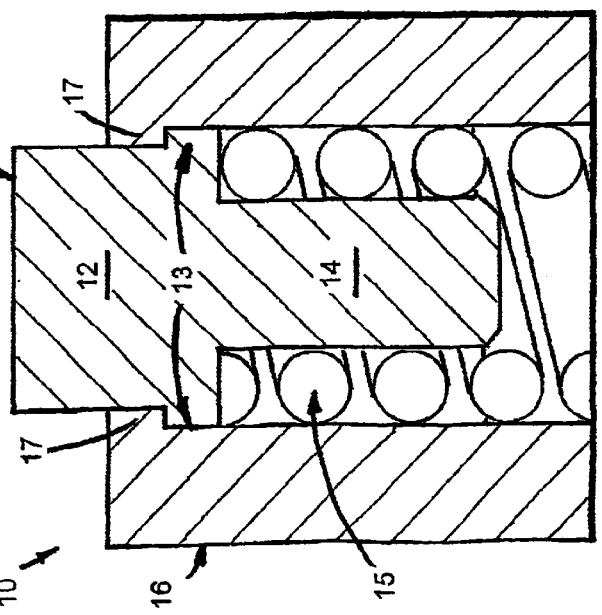

SPRING-LOADED EJECTORS FOR WOOD STRAND MOLDING

BACKGROUND OF THE INVENTION

A. Field of the Invention

The present invention relates to the revolutionary wood flake molding technology invented by wood scientists at Michigan Technological University during the latter part of the 1970s.

B. Background of the Art

Wood flake molding, also referred to as wood strand molding, is a technique for molding three-dimensionally configured objects out of binder coated wood flakes having an average length of about 1¼ to about 6 inches, preferably about 2 to about 3 inches; an average thickness of about 0.005 to about 0.075 inches, preferably about 0.015 to about 0.030 inches; and an average width of 3 inches or less, most typically 0.25 to 1.0 inches, and never greater than the average length of the flakes. These flakes are sometimes referred to in the art as "wood strands." This technology is not to be confused with oriented strand board technology (see e.g., U.S. Pat. No. 3,164,511 to Elmendorf) wherein binder coated flakes or strands of wood are pressed into planar objects. In wood flake or wood strand molding, the flakes are molded into three-dimensional, i.e., non-planar, configurations.

In wood flake molding, flakes of wood having the dimensions outlined above are coated with MDI or similar binder and deposited onto a metal tray having one open side, in a loosely felted mat, to a thickness eight or nine times the desired thickness of the final part. The loosely felted wood flake mat is then covered with another metal tray, and the covered metal tray is used to carry the mat to a mold. (The terms "mold" and "die", as well as "mold die", are sometimes used interchangeably herein, reflecting the fact that "dies" are usually associated with stamping, and "molds" are associated with plastic molding, and molding of wood strands does not fit into either category.) The top metal tray is removed, and the bottom metal tray is then slid out from underneath the mat, to leave the loosely felted wood flake mat in position on the bottom half of the mold. The top half of the mold is then used to press the mat into the bottom half of the mold at a pressure of approximately about 600 psi, and at an elevated temperature, to "set" (polymerize) the MDI binder, and to compress and adhere the compressed wood flakes into a final three-dimensional molded part. The excess perimeter of the loosely felted wood flake mat, that is, the portion extending beyond the mold cavity perimeter, is pinched off where the part defining the perimeter of the upper mold engages the part defining perimeter of the lower mold cavity. This is sometimes referred to as the pinch trim edge.

U.S. Pat. No. 4,440,708 and U.S. Pat. No. 4,469,216 disclose this technology. The drawings in U.S. Pat. No. 4,469,216 best illustrate the manner in which the wood flakes are deposited to form a loosely felted mat, though the metal trays are not shown. By loosely felted, it is meant that the wood flakes are simply lying one on top of the other in overlapping and interleaving fashion, without being bound together in any way. The binder coating is quite dry to the touch, such that there is no stickiness or adherence, which hold them together in the loosely felted mat. The drawings of U.S. Pat. No. 4,440,708 best illustrate the manner in which a loosely felted wood flake mat is compressed by the mold halves into a three-dimensionally configured article (see FIGS. 2–7, for example).

This is a very unusual molding process as compared to a molding process one typically thinks of, in which some type of molten, semi-molten or other liquid material flows into and around mold parts. Wood flakes are not molten, are not contained in any type of molten or liquid carrier, and do not "flow" in any ordinary sense of the word. Hence, those of ordinary skill in the art do not equate wood flake or wood strand molding with conventional molding techniques.

However, during the molding process, the molded wood part produced tends to adhere to the upper or lower mold half after the part is formed and the mold is opened. This adherence problem decreases the number of molded wood parts that can be produced during a production run of such parts, and increases the overall cost and time of production leading to production inefficiency. Conventional hydraulic ejector pins, like those used in plastic ejection molding, could be used in connection with a wood flake molding apparatus to eject the molded part from the upper and lower mold halves of the apparatus, but add significant cost to the mold. Spring-loaded ejector pins, like those used within stamping dies, could also be used in connection with a wood flake molding apparatus to eject the molded parts. However, spring-loaded ejector pins poke holes into the loosely-felted wood flake mat as it is compressed and cured between closing upper and lower mold halves of the molding apparatus.

SUMMARY OF THE INVENTION

In the present invention, it has been surprisingly discovered that by using one or more spring-loaded ejector pins having a pin head diameter of at least about 0.750 inches or greater and a loaded ejector pin pressure of approximately about 100 psi to 1000 psi within a mold apparatus, one can successfully mold a loosely felted wood flake mat into a molded part without poking holes in the mat or part, minimize or prevent excessive indentation and densification within the molded part at the point of contact with the ejector pin, and automatically eject the molded part from the mold as it is opened.

These and other features, advantages and objects of the present invention will be further understood and appreciated by those skilled in the art by reference to the following specification and claims.

BRIEF DESCRIPTION OF THE DRAWINGS

FIG. 1 is a vertical cross-sectional view of spaced upper and lower mold halves made in accordance with a preferred embodiment of the present invention, with spring-loaded ejectors in place in the upper and lower mold halves of the mold apparatus, and a loosely felted mat of wood flakes in place on the lower mold half;

FIG. 2 is a vertical cross-sectional view of the mold apparatus of the preferred embodiment of the present invention, but with the mold halves closed;

FIG. 4 is an enlarged cross-sectional view of a spring loaded ejector.

DETAILED DESCRIPTION OF THE PREFERRED EMBODIMENTS

Figure 3:
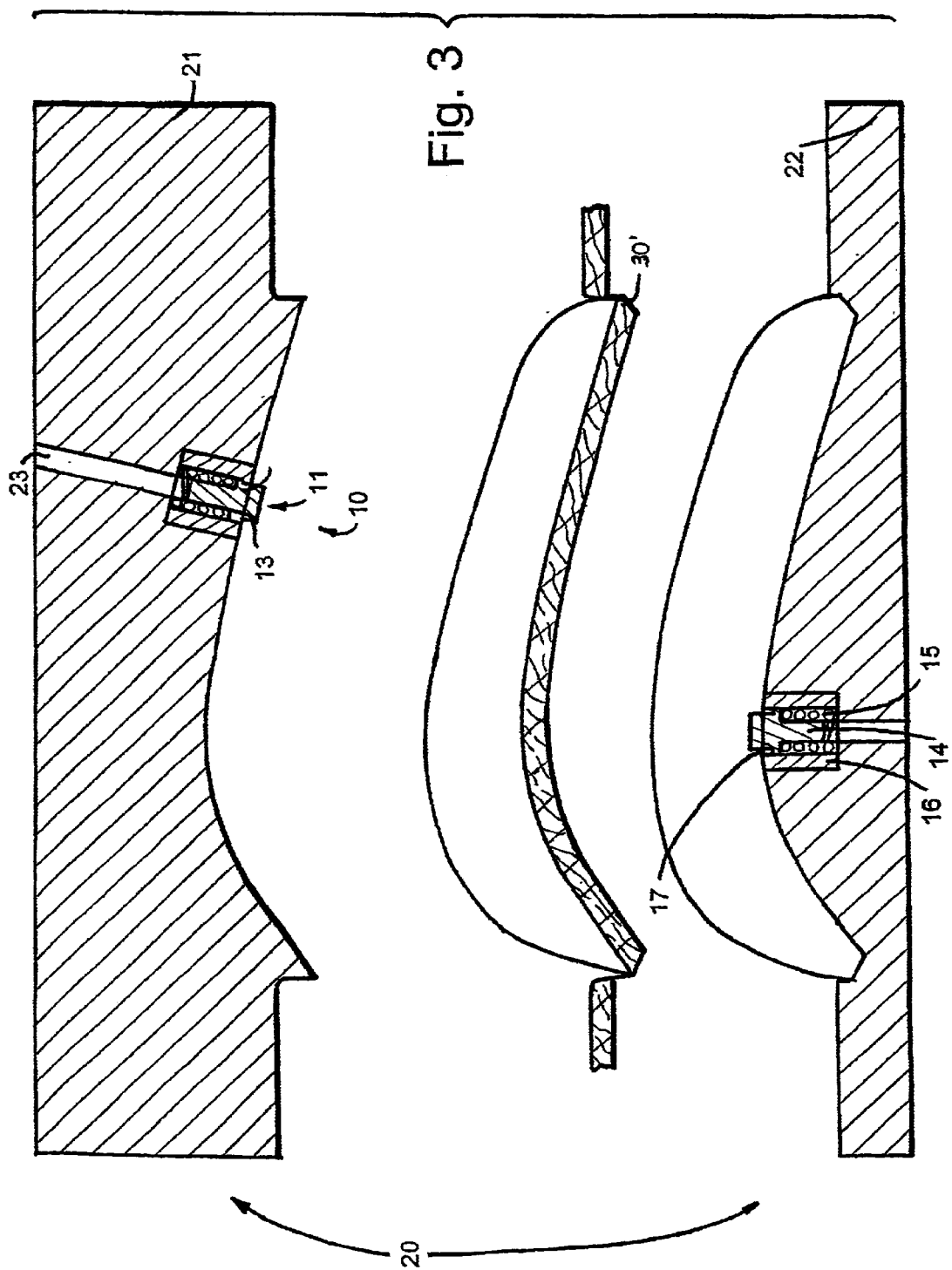
FIG. 3 is a vertical cross-sectional view of the mold apparatus of the preferred embodiment of the present invention, but with the mold reopened and the part removed.

In the preferred embodiment, at least one ejector pin assembly 10 is mounted in each of mold halves 21 and 22 of mold 20 (FIG. 1) such that as mold 20 is closed, loosely felted wood flake mat 30 is compressed and cured between upper mold half 21 and lower mold half 22 while ejector pin 11 of ejector pin assembly 10 is compressed against spring 15 (FIG. 2). When mold 20 is then opened, spring 15 causes ejector pins 11 to eject molded part 30' from mold 20 (FIG. 3).

Ejector pin assembly 10 comprises of ejector pin 11 which further comprises of ejector pin head 12 terminating at shoulder 13. Shank 14 extends from head 12 into the coil of spring 15 (FIG. 4). Pin 11 articulates inwardly against spring 15 when mold halves 21 and 22 of mold 20 are closed and compressed against mat part 30 and articulates outwardly when the mold halves are opened. Spring 15 is housed within housing 16, which is seated and secured in a receiving cavity bored into mold half 21 or 22, to a depth such that the surface of housing 16 is flush with the adjacent interior surface of mold half 21 or 22. Spring 15 bears against the mold half 21 or 22 at the bottom of the housing receiving bore, and its other end, against shoulder 13 of pin 11. Inwardly projecting annular spring retaining lip 17, at the top of housing 16, engages shoulder 13 of pin 11 to prevent spring 15 from forcing pin 11 out of housing 16.

During the molding process, as mold halves 21 and 22 are closed, ejector pin 11 is compressed inwardly against spring 15 (FIG. 2) into housing 16 until shank 14 compresses against and stops at the base of housing 16, which is seated within mold halves 21 and 22. The length of shank 14 of ejector pin 11 relative to spring housing 16 is such that shank 14 will bottom out against the base of spring housing 16 when the top of pin head 12 is flush with the top surface of mold half 21 or 22.

An ejector pin access tunnel 23 extends from the exterior of mold half 21 or 22, to the base of the bore which receives ejector pin housing 16. It is smaller in diameter than the shank 14, such that spring 15 surrounds its opening into the bore, and spring 15 cannot escape through tunnel 23. The access tunnel should be of smaller diameter than the shank so the shank bottoms out at the bottom of the housing bore, and acts as a "stop" to prevent excess compression of the pin. A tool can be inserted through access tunnel 23 to dislodge stuck ejector pins. Oil can be injected to lubricate such pins via ejector pin access tunnel 23.

It has been surprisingly discovered that a pin head 12 diameter of approximately about 0.750 inches or greater, under a loaded ejector pin pressure of from approximately about 100 psi to about 1000 psi, preferably about equal to mold pressure or less, and most preferably at about mold pressure, will successfully eject molded part 30' with minimal or no indentation and densification of the molded part 30', at the point of contact between loosely felted wood flake mat 30 and pin head 12. The term "loaded ejector pin pressure" means the pressure exerted at the surface of ejector pin head 12, via spring 15, when mold 20 is closed.

Typical maximum mold pressures in wood strand molding ranges from about 300 to 700 psi, with 600 psi being most preferred. Typically during the molding process then, the loosely felted wood flake mat 30 is initially pressed at a maximum mold pressure of about 600 psi for a period of time. Mold pressure is then decreased to about 200 psi or about one-third of the initial pressure for a time, and then pressure is decreased to a nominal level while the part continues to cure under the heat of mold 20, before mold 20 is opened.

The loaded ejector pin pressure of the preferred embodiment can be greater than the maximum mold pressure, but about 1000 psi maximum is preferred. The loaded ejector pin pressure of the preferred embodiment can be less than the preferred 100 psi, but one does not get as much ejection force from ejector pin 11 once mold halves 21 and 22 of mold 20 are opened to eject molded part 30'. By utilizing a loaded ejector pin pressure at about mold pressure, one achieves minimal or no indentation and densification at the point of contact between loosely felted wood flake mat 30 and pin head 12 during the molding process, but maximum ejection force from ejector pin 11 once mold halves 21 and 22 of mold 20 are opened to eject molded part 30' from the mold.

For example, ejector springs rated at about 1712 pounds per inch of deflection have about a 0.313-inch deflection or about 536 pounds of resistance when compressed during the molding process utilizing the preferred embodiment. The ejector pins 11 have a pin head 12 diameter of about 0.865 inch (0.5876 square inch) to exert a loaded ejector pin pressure of about 912 psi upon loosely felted wood flake mat 30 during mold processing, while the mold pressure is about 600 psi.

If one increases the spring rating, the pin head diameter should be increased to compensate for undesirable loaded ejector pin pressures which might indent or over densify the loosely felted wood flake mat when transformed into the mold part beyond suitable parameters. Longer stroke springs and ejectors are desirable when die thickness allows for a longer ejector assembly.

To produce molded wood strand products, binder coated felted wood flake mat 30 is first placed between upper mold halves 21 and 22 of mold 20, overlying the cavity of lower mold half 21 (FIG. 1). Before compressing and curing, ejector pin assembly 10 is in its original position within mold halves 21 and 22, such that ejector pin 11 is not depressed against spring 15 within housing 16, pin head 12 is not flush with the surfaces of mold halves 21 and 22, and shank 14 is not stopped against the mold at the base of housing 16.

Then, both mold halves 21 and 22 of mold 20 are closed to apply heat and pressure to compress and cure felted wood flake mat 30 (FIG. 2). During this compressing and curing step, ejector pin 11 of ejector pin assembly 10 in each of mold halves 21 and 22 is compressed inwardly against spring 15 within housing 16 until pin head 12 is flush with the surface of mold halves 21 and 22 of mold 20, and shank 14 is stopped against the base of housing 16 to prevent indentation and densification of felted wood flake mat 30 at its point of contact with pin head 12.

Following the compressing and curing step, mold halves 21 and 22 of mold 20 are opened to reveal felted wood flake mat 30 which has been transformed into molded part 30' (FIG. 3). Molded part 30' once formed, is ejected from the opened mold 20 via ejector pin 11 of ejector assembly 10 when spring 15 outwardly forces shank 14 from housing 16 until shoulder 13 is flush and stopped against inwardly projecting spring retaining lip 17. In this manner, pin head 12 returns to its original position which is not flush with the surface of mold halves 21 and 22 to eject molded part 30' from mold 20 to complete the molding process (FIG. 3).

The wood flakes used can be prepared from various species of suitable hardwoods and softwoods used in the manufacture of particleboard. Representative examples of suitable woods include aspen, maple, oak, elm, balsam fir, pine, cedar, spruce, locust, beech, birch and mixtures thereof. Aspen is preferred.

Suitable wood flakes can be prepared by various conventional techniques. Pulpwood grade logs, or so-called round wood, are converted into flakes in one operation with a conventional roundwood flaker. Logging residue or the total tree is first cut into fingerlings in the order of 2–6 inches long with a conventional device, such as the helical comminuting shear disclosed in U.S. Pat. No. 4,053,004, and the fingerlings are flaked in a conventional ring-type flaker.

Roundwood flakes generally are higher quality and produce stronger parts because the lengths and thickness can be more accurately controlled. Also, roundwood flakes tend to be somewhat flatter, which facilitates more efficient blending and the logs can be debarked prior to flaking which reduces the amount of less desirable fines produced during flaking and handling. Acceptable flakes can be prepared by ring flaking fingerlings and this technique is more readily adaptable to accept wood in poorer form, thereby permitting more complete utilization of certain types of residue and surplus woods.

Irrespective of the particular technique employed for preparing the flakes, the size distribution of the flakes is quite important, particularly the length and thickness. The wood flakes should have an average length of about 1¼ inch to about 6 inches and an average thickness of about 0.005 to about 0.075 inches. The average length of the wood flakes is preferably about 2 to about 3 inches. In any given batch, some of the flakes can be shorter than 1¼ inch, and some can be longer than 6 inches, so long as the overall average length is within the above range. The same is true for the thickness.

The presence of major quantities of flakes having a length shorter than about 1¼ inch tends to cause the mat to pull apart during the molding step. The presence of some fines in the mat produces a smoother surface and, thus, may be desirable for some applications so long as the majority of the wood flakes, preferably at least 75%, is longer than 1⅛ inch and the overall average length is at least 1¼ inch.

Substantial quantities of flakes having a thickness of less than about 0.005 inches should be avoided, because excessive amounts of binder are required to obtain adequate bonding. On the other hand, flakes having a thickness greater than about 0.075 inch are relatively stiff and tend to overlie each other at some incline when formed into the mat. Consequently, excessively high mold pressures are required to compress the flakes into the desired intimate contact with each other. For flakes having a thickness falling within the above range, thinner ones produce a smoother surface while thick ones require less binder. These two factors are balanced against each other for selecting the best average thickness for any particular application. The average thickness of the flakes preferably is about 0.015 to about 0.25 inches, and more preferably about 0.0020 inch.

The width of the flakes is less important. The flakes should be wide enough to ensure that they lie substantially flat when felted during mat formation. The average width generally should be about 3 inches or less and no greater than the average length. For best results, the majority of the flakes should have a width of about ¹⁄₁₆-inch to about 3 inches, and preferably 0.25 to 1.0 inches.

The blade setting on the flaker can primarily control the thickness of the flakes. The length and width of the flakes are also controlled to a large degree by the flaking operation. For example, when the flakes are being prepared by ring flaking fingerlings, the length of the fingerlings generally sets the maximum lengths. Other factors, such as the moisture content of the wood and the amount of bark on the wood affect the amount of fines produced during flaking. Dry wood is more brittle and tends to produce more fines. Bark has a tendency to more readily break down into fines during flaking and subsequent handling than wood.

While the flake size can be controlled to a large degree during the flaking operation as described above, it usually is necessary to use some sort of classification in order to remove undesired particles, both undersized and oversized, and thereby ensure the average length, thickness and width of the flakes are within the desired ranges. When roundwood flaking is used, both screen and air classification usually are required to adequately remove both the undersize and oversize particles, whereas fingerling flakes usually can be properly sized with only screen classification.

Flakes from some green wood can contain up to 90% moisture. The moisture content of the mat must be substantially less for molding as discussed below. Also, wet flakes tend to stick together and complicate classification and handling prior to blending. Accordingly, the flakes are preferably dried prior to classification in a conventional type drier, such as a tunnel drier, to the moisture content desired for the blending step. The moisture content to which the flakes are dried usually is in the order of about 6-weight % or less, preferably about 2 to about 5-weight %, based on the dry weight of the flakes. If desired, the flakes can be dried to a moisture content in the order of 10 to 25 weight % prior to classification and then dried to the desired moisture content for blending after classification. This two-step drying may reduce the overall energy requirements for drying flakes prepared from green woods in a manner producing substantial quantities of particles which must be removed during classification and, thus, need not be as thoroughly dried.

To coat the wood flakes prior to being placed as a loosely felted wood flake mat 30 within the cavity of lower mold half 22 within mold 20 of the preferred embodiment, a known amount of the dried, classified flakes is introduced into a conventional blender, such as a paddle-type batch blender, wherein predetermined amounts of a resinous particle binder, and optionally a wax and other additives, is applied to the flakes as they are tumbled or agitated in the blender. Suitable binders include those used in the manufacture of particleboard and similar pressed fibrous products and, thus, are referred to herein as "resinous particle board binders." Representative examples of suitable binders include thermosetting resins such as phenolformaldehyde, resorcinol-formaldehyde, melamine-formaldehyde, urea-formaldehyde, urea-furfuryl and condensed furfuryl alcohol resins, and organic polyisocyantes, either alone or combined with urea- or melamine-formaldehyde resins.

Particularly suitable polyisocyanates are those containing at least two active isocyanate groups per molecule, including diphenylmethane diisocyanates, m- and p-phenylene diisocyanates, chlorophenylene diisocyanates, toluene di- and triisocyanates, triphenylmethene triisocyanates, diphenylether-2,4,4'-triisoccyanate and polyphenylpolyisocyanates, particularly diphenylmethane-4,4'-diisocyanate. So-called MDI is particularly preferred.

The amount of binder added to the flakes during the blending step depends primarily upon the specific binder used, size, moisture content and type of the flakes, and the desired characteristics of the part being formed. Generally, the amount of binder added to the flakes is about 2 to about 15-weight %, preferably about 4 to about 10-weight %, as solids based on the dry weight of the flakes. When a polyisocyanate is used alone or in combination with a urea-formaldehyde resin, the amounts can be more toward the lower ends of these ranges.

The binder can be admixed with the flakes in either dry or liquid form. To maximize coverage of the flakes, the binder preferably is applied by spraying droplets of the binder in liquid form onto the flakes as they are being tumbled or agitated in the blender. When polyisocyantes are used, a conventional mold release agent preferably is applied to the die or to the surface of the felted mat prior to pressing. To improve water resistance of the part, a conventional liquid wax emulsion preferably is also sprayed on the flakes during the blinding step. The amount of wax added generally is about 0.5 to about 2 weight %, as solids based on the dry weight of the flakes. Other additives, such as at least one of the following: a coloring agent, fire retardant, insecticide, fungicide, mixtures thereof and the like may also be added to the flakes during the blending step. The binder, wax and other additives, can be added separately in any sequence or in combined form.

The mixture of binder, wax and flakes or "furnish" from the blending step is formed into a loosely felted, layered wood flake mat 30, which is placed within the cavity of lower mold half 22 prior to the molding and curing of the mat into a molded wood particle product. The moisture content of the flakes should be controlled within certain limits so as to obtain adequate coating by the binder during the blending step and to enhance binder curing and deformation of the flakes during molding.

The presence of moisture in the flakes facilitates their bending to make intimate contact with each other and enhances uniform heat transfer throughout the mat 30 during the molding step, thereby ensuring uniform curing. However, excessive amounts of water tend to degrade some binders, particularly urea-formaldehyde resins, and generate steam which can cause blisters. On the other hand, if the flakes are too dry, they tend to absorb excessive amounts of the binder, leaving an insufficient amount on the surface to obtain good bonding and the surfaces tend to cause hardening which inhibits the desired chemical reaction between the binder and cellulose in the wood. This latter condition is particularly true for polyisocyanate binders.

Generally, the moisture content of the furnish after completion of blending, including the original moisture content of the flakes and the moisture added during blending with the binder, wax and other additives, should be about 5 to about 25 weight %, preferably about 5 to about 7 weight %. Generally, higher moisture contents within these ranges can be used for polyisocyanate binders because they do not produce condensation products upon reacting with cellulose in the wood.

The furnish is formed into a generally flat, loosely felted, mat, preferably as multiple layers. A conventional dispensing system, similar to those disclosed in U.S. Pat. Nos. 3,391,223 and 3,824,058, and 4,469,216 can be used to form the mat. Generally, such a dispensing system includes trays, each having one open side, carried on an endless belt or conveyor and one or more (e.g., 3) hoppers spaced above and along the belt in the direction of travel for receiving the furnish.

When a multi-layered mat is formed in accordance with a preferred embodiment, a plurality of hoppers usually are used with each having a dispensing or forming head extending across the width of the forming belt for successively depositing a separate layer of the furnish as the tray is moved beneath the forming heads. Following this, the tray is taken to mold 20 to place the loosely felted mat 30 within the cavity of lower mold half 22, by sliding the tray out from under mat 30.

In order to produce molded wood strand products having the desired edge density characteristics without excessive blistering and springback, the loosely felted mat 30 should preferably have a substantially uniform thickness and the flakes should lie substantially flat in a horizontal plane parallel to the surface of the forming belt and be randomly oriented relative to each other in that plane. The uniformity of the mat thickness can be controlled by depositing two or more layers of the furnish on the forming belt and metering the flow of furnish from the forming heads.

Spacing the forming heads above the forming belt so the flakes must drop about 1 to about 3 feet from the heads en route to the carriage can enhance the desired random orientation of the flakes. As the flat flakes fall from that height, they tend to spiral downwardly and land generally flat in a random pattern. Wider flakes within the range discussed above enhance this action. A scalper or similar device spaced above the forming belt can be used to ensure uniform thickness or depth of the mat, however, such means usually tend to align the top layer of flakes, i.e., eliminate the desired random orientation. Accordingly, the thickness of the mat preferably is controlled by closely metering the flow of furnish from the forming heads.

The mat thickness used will vary depending upon such factors as the size and shape of the wood flakes, the particular technique used for forming the mat, the desired thickness and density of the mold wood product produced, the configuration of the molded wood product, and the molding pressure to be used. In addition, after the molded wood strand part is produced by the method of the present invention, any flashing and any plugs are removed by conventional means, and the peripheral edges of the molded part can be trimmed to the desired final dimensions. The preferred embodiment of the present invention can include means, which provide built-in trimming and removal of plugs and flashing during processing as well.

Molding temperatures, pressures and times vary widely depending upon the thickness and desired density of the molded wood strand part 30', size and type of wood flakes, moisture content of the flakes, and the type of binder used. The molding temperature used is sufficient to at least partially cure the binder and expel water from the loosely felted wood flake mat 30 within a reasonable time period and without charring the wood. Generally, a molding temperature ranging from ambient up to about 450° F. can be used. Temperatures above about 450° F. can cause charring of the wood. When a binder system including, a urea-formaldehyde resin and a polyisocyanate is used, a molding temperature of about 250° to about 375° F. is preferred, while a molding temperature of about 300° to about 425° F. is preferred for phenol-formaldehyde resin binders.

The molding pressure used should be sufficient to press the wood flakes into intimate contact with each other without crushing them to the point where lignin starts to exude, causing a breakdown in the fibers with a resultant degradation in structural integrity. The maximum molding pressure on the net die/mold area typically is about 300 to 700 psi.

The time of the molding or press cycle is sufficient to at least partially cure the binder to a point where the molded wood part has adequate structural integrity for handling. The press cycle typically is about 2 to about 10 minutes; however, shorter or longer times can be used when pressure-curing binders are employed when more complete curing of certain thermosetting binders is desired.

The mold apparatus having spring-loaded ejector assemblies of the preferred embodiment and method of ejecting molded wood parts produced using such an embodiment solve problems of producing such parts, which were not solved by the prior art. The preferred embodiment and method of production using the preferred embodiment solve the problem of molded wood parts sticking to the mold apparatus, increase efficiency of molded wood part production, and allow for production of molded wood parts in an assembly-line like fashion without having to remove each molded part by hand or other non-automated means when produced.

In addition, the preferred embodiment and method of production utilizing the preferred embodiment allow for the surprising discovery that molded wood parts can be ejected from mold apparatuses without poking holes in the loosely felted wood flake mat, without causing excessive indentation and densification of the mat at the point of contact with the pin head, and at a low cost, by using spring-loaded ejector assemblies having a pin head diameter of at least about 0.750 inches or greater.

Without further elaboration, it is believed that one skilled in the art can, using the preceding description, utilize the present invention to its fullest extent. The above description, however, is that of the preferred embodiments only. Modifications of the invention will occur to those skilled in the art and to those who make or use the invention. Therefore, it is understood that the embodiment described above is merely for illustrative purposes and not intended to limit the scope of the invention, which is defined by the following claims as interpreted according to the principles of patent law, including the Doctrine of Equivalents.

The invention claimed is:

1. An apparatus for ejecting a molded wood part from a mold apparatus comprising:
   a lower mold half and an upper mold half, each having a surface configured to define a cavity therebetween;
   at least one ejector pin assembly in at least one of said mold halves wherein said ejector assembly further comprises:
     a housing having an inwardly projecting retainer lip, which surrounds an ejector pin opening;
     an ejector pin positioned in said housing, and having a pin head projecting through said housing opening and terminating at an outwardly projecting shoulder, from which extends a narrower shank, wherein the diameter of said pin head is at least about 0.750 inches or greater;
     a spring contained within said housing and bearing against said shoulder of said ejector pin, said ejector pin shank extending into said housing;
     said ejector pin shoulder bearing against said retainer lip under pressure of said spring;
     said spring compressing inwardly and expanding outwardly allowing said ejector pin to articulate inwardly and outwardly when compressed and decompressed by said mold halves; and
     said spring being selected so as to exert a loaded ejector pin pressure, at the surface of said pin head, of from approximately about 100 psi to 1000 psi when said mold upper and lower mold halves are closed on a part located in the closed mold.

2. The apparatus of claim 1, wherein said pin head diameter is 0.865 inch.

3. The apparatus of claim 1, wherein said loaded ejector pin pressure is 600 psi.

4. The apparatus of claim 1, wherein said loaded ejector pin pressure is about equal to or less than mold pressure exerted by said mold halves of said mold.

5. The apparatus of claim 1, wherein said loaded ejector pin pressure is approximately equal to a mold pressure exerted by said mold halves of said mold.

6. A method of ejecting a molded three dimensionally curved article formed from binder coated wood flakes from a mold apparatus comprising:
   forming a loosely felted mat of said wood flakes;
   depositing said mat onto a lower mold half of said mold apparatus;
   compressing and heating said mat between an upper mold half and said lower mold half, said mold halves forming a part defining mold cavity therebetween to form a molded wood part; and
   ejecting said molded part via at least one ejector pin assembly in at least one of said mold halves wherein said ejector assembly further comprises:
     a housing having an inwardly projecting retainer lip, which surrounds an ejector pin opening;
     an ejector pin positioned in said housing, and having a pin head projecting through said housing opening and terminating at an outwardly projecting shoulder, from which extends a narrower shank, wherein the diameter of said pin head is at least about 0.750 inches or greater;
     a spring contained within said housing and bearing against said shoulder of said ejector pin, said ejector pin shank extending into said housing;
     said ejector pin shoulder bearing against said retainer lip under pressure of said spring;
     said spring compressing inwardly and outwardly allowing said ejector pin to articulate inwardly and expanding outwardly when compressed and decompressed by said mold halves; and
     said spring being selected so as to exert a loaded ejector pin pressure, at the surface of said pin head, of from approximately about 100 psi to 1000 psi when said mold upper and lower mold halves are closed on said loosely felted mat.

7. The method of claim 6, wherein said wood flakes have an average length of from about 1¼ to about 6 inches, an average thickness of from about 0.015 to about 0.25 inches, and an average width of less than the average length, and no greater than about 3 inches.

8. The method of claim 7, wherein said wood flakes of said mat have an average length of from about 2 to about 6 inches.

9. The method of claim 7, wherein said wood flakes of said mat have an average thickness of from about 0.015 to about 0.030 inches.

10. The method of claim 7, wherein said wood flakes of said mat have an average width of from about 0.25 to about 1.0 inches.

11. The method of claim 7, wherein said pin head diameter is 0.865 inch.

12. The method of claim 7, wherein said loaded ejector pin pressure is 600 psi.

13. The method of claim 7, wherein said loaded ejector pin pressure is about equal to or less than mold pressure exerted by said mold halves of said mold.

14. The method of claim 7, wherein said loaded ejector pin pressure is approximately equal to mold pressure exerted by said mold halves of said mold.

* * * * *